United States Patent Office 3,671,274
Patented June 20, 1972

3,671,274

BATHS FOR ACTIVATING THE SURFACE OF PLASTICS TO BE CHEMICALLY METAL-PLATED

Hiroshi Maekawa, Osaka, and Choji Yamauchi, Fuse, Japan; said Maekawa assignor to Giichi Okuno, Higashi-ku, Osaka-shi, Japan No Drawing. Continuation-in-part of application Ser. No. 570,702, Aug. 8, 1966. This application May 6, 1970, Ser. No. 35,260
Claims priority, application Japan, Aug. 6, 1965, 40/47,912
Int. Cl. C23c 3/00
U.S. Cl. 106—1 11 Claims

ABSTRACT OF THE DISCLOSURE

Plastic surface is activated for subsequent chemical metal plating by treatment with a solution containing, as essential ingredients, sulfuric acid, silver compound and metal halide, as optional ingredients, chrominum compound and phosphoric acid.

This invention relates to a process for activating the surface of plastics which are to be chemically plated, particularly to an improved and useful process for activating the surface of plastics which are to be subjected to electroless plating of copper or nickel, the invention also relating to the bath to be used for the purpose.

This application is a continuation-in-part of our copending application Ser. No. 570,702 filed on Aug. 8, 1966, now abandoned.

Plastics, although currently used extensively, have drawbacks such as deterioration by ultra-violet rays, electrification, and poor surface hardness. Attempts have been made to metal-plate the surface of plastics with a view to eliminating these drawbacks and further developing new uses. It is impossible to directly electroplate plastics because of its nonelectroconductivity, so that the surface of plastics should first be activated by a preliminary chemical treatment, the activated surface being then plated with copper or nickel by a chemical procedure to turn the surface electroconductive before it is subjected to ordinary electroplating. The preliminary treatment for activation is indispensable for metal-plating plastics, and the skill in the treatment materially affects the chemically-plated metal layer and the final electroplated layer. If the preliminary treatment is insufficient, the chemically plated metal layer is apt to be uneven and to peel off the surface of plastics, while an excessive preliminary treatment will produce objectionable rugged surface in the metal layer. The uneven or rugged surface of chemically plated metal layer impairs its adhesion to electroplated layer, reducing the luster and smoothness of the electroplated layer.

Various proposals have been made as to the method of preliminary treatment for the activation, but conventional methods so far suggested are incapable of effecting sufficient activation or troublesome and complicated in operation. For example, a preliminary treatment method which is extensively applied in the industry for activation comprises dipping plastic to be plated in a mixture of chromic acid and sulphuric acid to turn the surface thereof wettable (etching) after roughing the surface as required by tumbling or liquid-honing, dipping the etched plastic in hydrochloric acid solution of stannous chloride to cause it to adsorb stannous chloride on the surface (sensitizing), and then dipping the plastic in a solution containing inorganic salt of catalytic metals such as gold, silver, palladium, platinum, etc., to make the catalytic metal deposit on the surface of plastic (activation), rinsing with water being conducted between successive processes.

This publicly known method, however, consists of 3-step processes, etching, sensitizing and activating, each of which is complicated, and if any of the processes or the rinsing between the processes happens to be unsatisfactory the surface of plastics can not be activated as desired. Thus, this well-known method necessitates not only high expenditure for labor and treating liquid but also a high skill and careful attention for each process. Although attempts have been made also for simplifying the preliminary treatment, none of the simplified methods have been found feasible without sacrificing the adhesive strength of metal-plated layer to plastics or luster of the metal-plated layer. It is suggested, for instance, to activate the surface of plastics by treating in an aqueous solution of catalytic metal such as palladium chloride containing stannous chloride after etching, but in this manner metal palladium may be precipitated in a relatively short time due to reduction by stannous chloride to make the bath unfit for further use, and furthermore, when the surface activated in this manner is chemically plated, partially non-metal-plated portions may occur on the surface, and insufficient adhesive strength of metal-plated layer to plastics results.

In order to eliminate these difficulties, another method has been suggested in which plastic treated with an aqueous chromic acid solution is activated in an aqueous sulfuric acid solution of a noble metal compound such as palladium chloride. This method still requires two steps of treatment and the surface of a plastic activated by this method, when chemically plated, is frequently left uncoated locally. This tendency is more pronounced particularly with plastic products of complex forms such as knobs for TV or radio sets.

An object of the present invention is to overcome the drawbacks of preliminary treatment of the conventional methods described and to thereby provide an improved and useful method for activating the surface of plastics to be metal-plated and a bath composition thereof.

Another object of this invention is to provide a method for activating the surface of plastics by a single step of treatment without preceding etching and sensitizing processes which are required in conventional methods and a bath composition therefor.

Another object of the present invention is to provide a method for activating the surface of plastics which insures satisfactory plating in a subsequent process even with plastic articles of complex forms such as knobs of TV or radio sets.

Still another object of the present invention is to provide a simplified method for activating the surface of plastics by which strong adhesion is provided between a plastic work and a smooth-surfaced metal layer chemically deposited thereon and which makes it possible to form a final electroplated layer on the plastic work with high adhesive strength.

The above and other objects of this invention will become apparent from the description to follow.

In accordance with this invention, the surface of a plastic can be activated by treating the plastic in a bath comprising:

(1) 700 to 1200 grams per liter of $H_2SO_4$, (2) 0.03 to 9 grams per liter by a silver compound amount of silver ion, said silver compound being one species selected from the group consisting of silver oxide, silver nitrate, silver sulfate, silver chromate, and silver carbonate, and (3) 0.5 to 5 g. eq. of a metal halide per g. eq. of said silver compound, said metal halide being one species selected from the group consisting of alkali metal and alkali earth metal halide.

When a plastic to be plated is treated in the bath of this invention described above, the surface of plastic can be readily activated by treatment of a single step, and when the plastic thus activated is subjected to metal plating in a chemical copper plating bath of a conventional type, uniform and smooth surfaced metal plated layer is formed on the surface of the plastic with sufficient adhesive strength. In addition, one of the outstanding features of the present method is that plastic materials of complicated shapes, if treated by this method, can be metal-plated on its entire surface in a subsequent step of chemical copper plating notwithstanding that the sulfuric acid content in the bath is not more than 1200 g./liter, a concentration easy to handle. According to the researches of the present inventors, such results can be achieved only when the above-mentioned specific compound of silver is used in combination with an alkali metal halide or an alkali earth metal halide. Use of a compound of a catalytic metal other than silver or use of the silver compound without addition of a metal halide fails to produce such effects. For instance, in the case where a plastic work is dipped for activation in a sulfuric acid bath containing the specific silver compound but no metal halide and subsequently subjected to chemical copper plating, the work is not always coated with a plated copper layer on its entire surface but some portions thereof are frequently left uncoated, this tendency being pronounced especially with articles of complicated forms. The sulfuric acid content, when increased to more than 1400 g./liter, i.e., to a concentration of more than 80% by weight, will result in greater extent of coating, but use of a sulfuric acid bath of a high concentration is liable to impair operation efficiency as well as quality of the plastic material itself by the mist of sulfuric acid.

The theoretical reasons why this invention produces such excellent effects has not been clarified yet. However, the effects may presumably be attributable to the following:

Halogen ion of the metal halide and silver ions of the silver compound are formed into very fine particles (not greater than $0.1\mu$) of AgCl in the bath and the particles are suspended in the bath to give a hydrophobic sol. The fine particles, being positively charged on the surfaces, are effectively adsorbed to the surface of plastic which is charged negatively. Accordingly, it is assumed that when plastic articles are subjected to the activating treatment of the invention, the articles, even if they have many edges and corners, can be coated with plated metal layer over the entire surface by a subsequent treatment for chemical metal plating. On the other hand, when AgCl alone, in place of the combination of the specific silver compound and metal halide, is added to the bath, minute particles of AgCl positively charged as described above are not formed, hence low coating effect.

The silver compound to be used in the present invention includes silver oxide, silver nitrate, silver sulfate, silver chromate and silver carbonate, the most desirable being silver sulfate. Employable as the metal halide are alkali metal or alkali earth metal halide, the typical examples being chlorides, bromides and iodides of lithium, sodium, potassium and calcium such as lithium chloride, sodium chloride, potassium chloride, calcium chloride, lithium bromide, sodium bromide, potassium bromide, calcium bromide, lithium iodide, sodium iodide, potassium iodide, calcium iodide, etc., the most desirable being sodium chloride, potassium chloride, calcium chloride, potassium bromide and potassium iodide.

According to the present invention, full extent of chemical plating can be provided for plastic articles including those of complex forms by using $H_2SO_4$ whose concentration is as low as 700–1200 g./liter, preferably 950–1200 g./liter. The concentration of $H_2SO_4$, if lower than this range, results in insufficient activation effect and therefore poor adhesion of the chemically plated metal layer to plastic, whereas if it is higher than the range, mist of sulfuric acid deteriorates operation efficiency and the quality of the plastic itself.

The concentration of the silver ion in the bath can be varied in the range of 0.03 to 9 g./liter by the amount of the silver compound. The preferable range is of 0.1–5 g./liter in view of economy and solubility of the metal compound in sulfuric acid.

The concentration of halogen ion in the bath is in the range of 0.5–5 g. eq. preferably 1–3 g. eq. of metal halide per g. eq. of the silver compound. If the concentration is higher than this range, HCl gas generated impairs operation efficiency.

According to the present invention, a chromium compound (VI) may further be added to the bath which contains sulfuric acid, silver ion and halogen ion. If chromium compound is present, the concentration of the sulfuric acid in the bath should be 520–1200 g./liter, preferably 700–1200 g./liter, and the concentration of silver ion is 0.03 to 9 g./liter, preferably 0.1 g./liter by silver compound amount.

Chromium compound, when present in the bath, serves to accelerate activation of the surface of plastic with greater efficiency as compared with a bath such as already mentioned which contains only sulfuric acid, silver compound and metal halide.

The chromium (VI) compounds may comprise chromic acid, chromic acid anhydride, and alkali metal chromate or bichromate such as potassium chromate, sodium bichromate, potassium bichromate, etc. and the said compound may be contained in the bath at a concentration of 1–50 g./liter by the amount reduced to $CrO_3$, preferably 6–45 g./liter. If the amount of the chromium compound is smaller than the above-specified range, activation can not be accelerated. On the other hand, use of chromium compound in an amount exceeding this range accelerates activation to excess and brings about possible corrosion in the surface of plastic to impair the quality of the plastic. In such an instance, it is also likely that chlorine gas generated may reduce chromium compound to retard acceleration of activation.

To restrict corrosion on plastic due to excess activation produced by a relatively high concentration (1200 g./liter) of sulfuric acid or the chromium compound present in the bath, $H_3PO_4$ may be added to the bath of this invention in the range of 50–500 g./liter, preferably in the range of 150–200 g./liter. The amount of $H_3PO_4$, if smaller than this range, fails to achieve restriction effect, whereas if it is more than this range, the concentrations of sulfuric acid, silver compound and metal halogenide are lowered, making it difficult to obtain satisfactory activation. The amounts of the respective components in the bath containing sulfuric acid, silver compound, metal halide and phosphoric acid are: 500–1200 g./liter, preferably 700–1200 g./liter for sulfuric acid; 1–50 g./liter, preferably 6–45 g./liter for $CrO_3$; 0.03–9 g./liter, preferably 0.1–5 g./liter for silver ion in terms of amount of the silver compound; and 0.5–5 g. eq., preferably 1–3 g. eq. of metal halide per g. eq. of the silver compound.

Plastics which can be activated in these baths comprise various polymers such as acrylonitrile-butadienestyrene copolymer (hereinafter referred to as "ABS resin"), acrylonitrile-styrene copolymer, polystyrol, polyester, polyethylene, polypropylene, polyurea, polycarbonate, etc., and these baths are particularly effective on ABS resin. These plastics may be employed in the form of various plastics moldings such as the parts of television and radio sets, sweeping machines, refrigerators and other electrical appliances including, for example, cabinets and knobs for television and radio sets, meters, doors and handles for automobiles, parts of typewriters, telephones and other office machines, buttons, beads, broaches, etc. According to the invention the surfaces of any complicated forms of moldings can be uniformly activated. The plastics except ABS resin may be desirably subjected to the conventional roughing process prior to the activation process of the invention.

The activation treatment of the invention is carried out by dipping plastic in the bath abovementioned. Generally, the temperature of the bath may be 10–80° C. desirably 30–70° C. The dipping time which varies according to the composition of the bath, treating temperature, the nature of plastics to be activated and other factors may be such as is sufficient to activate the surface of plastic. It is generally 1–20 min., desirably 5–15 min. By this treatment hydrophilic groups such as —$SO_3H$, —COOH, and —OH groups are introduced to the surface of plastics and the silver halide produced in the bath is adsorbed thereto, with the result that the surface is turned wettable with water and highly activated. The silver halide is adsorbed strongly to the surface of plastics, so that the activity of the plastics is not impaired by repeated washing with water or by being left to stand for a long period of time.

The plastic activated according to the invention is then washed with water, generally with running water, and dried as required, after which it is dipped in a chemical copper bath in the conventional manner for metal-plating.

Since the surface of a plastic material treated according to the invention is activated to a markedly higher extent than is the case with the publicly known methods and the bath used in this invention includes halogen ion and catalytic silver ion, the resultant silver halide is adsorbed strongly to the surface of plastic and resultant chemically plated metal layer becomes highly adhesive to plastics to form a uniform and smooth surface, while almost entire surface of the plastic material can be covered with deposited metal, assuring an excellent adhesive property of the final electroplated layer.

The chemical copper plating bath used in the invention may be a conventional one which contains a water-soluble inorganic salt of copper (II), complexing agent, reducing agent and alkaline substance, and the plastic activated according to the invention can be readily metal-plated in these publicly known baths. For chemical plating, the plastic activated according to the invention may be merely dipped in such metal-plating bath at 10–40° C., particularly 15–35° C. for 1–20 min.

For better understanding of the invention examples will be given hereinafter, wherein the peeling test was carried out in the following manner:

PEELING TEST

Over the entire length of chemical plated surface of the sample two parallel lines 1 cm. apart were cut as deep as to reach the surface of the plastic and one end of the chemical plated layer cut 1 cm. wide was stripped off and pulled at an angle of 90° at the rate of 3 cm./min. and the force required (kg./cm.) was sought.

Example 1

Activation.—A channel selector knobs, 80 mm. in diameter, for television receiver made of ABS resin (product of Ube Saikon K. K. with trademark, "Cycolac" EP 13510) were dipped in an aqueous bath shown below for 5 min. at the temperature listed in Table 1.

$H_2SO_4$—1200 g./liter
$Ag_2SO_4$—1 g./liter
NaCl—2 g./liter
Water—Amount necessary for making 1 liter of bath solution.

After immersion, the resin knobs thus activated were washed with running water and dried at room temperature.

Chemical plating.—The activated resin material obtained as above was dipped for 10 min. at 20° C. in 1 liter of an aqueous bath containing:

| | G./liter |
|---|---|
| $CuSO_4 \cdot 5H_2O$ | 30 |
| Rochelle salt | 50 |
| 37% Formalin | 30 |
| NaOH | 15 |

After immersion, the sample thus chemically plated was washed with running water and dried at room temperature. The layer of the chemically plated material had a smooth surface with strong adhesion of the layer effected to the resin material. The covering rate represented by percentage of the surface area of the deposited metal layer relative to the entire surface area of the plastic material was shown in Table 1 with the result of peeling test on the plated layer.

TABLE 1

| Activation temperature (° C.) | Covering rate (percent) | Peeling test (kg./cm.) |
|---|---|---|
| 37 | 100 | 1.4 |
| 50 | 100 | 1.6 |
| 70 | 100 | 2.2 |

Comparison 1.—For comparison activation treatment of the same knobs of ABS resin as in Example 1 was carried out under the same conditions as in Example 1 except that the bath contained no NaCl. The activated resin material obtained was subjected to chemical plating under the same conditions as in Example 1. The covering rate of the chemically plated layer formed was measured with the result listed in Table II.

TABLE II

| Activation temperature (° C.): | Covering rate (percent) |
|---|---|
| 37 | 60 |
| 50 | 60 |
| 70 | 90 |

It will be seen from the result in Table II above that the treatment with the bath containing silver sulfate but no sodium chloride resulted in a low covering rate, while, as evident from Table 1 before, the treatment with the present bath containing silver sulfate in combination with sodium chloride achieved the covering rate of 100%.

Example 2

The same knobs of ABS resin as in Example 1 was activated in the same manner as in Example 1, except that the bath having a $H_2SO_4$ content of 900 g./liter was used and activation temperature of 50° C. was applied. The activated material was then chemically plated in the same manner as in Example 1, with the result shown below:

Covering rate—100%
Peeling test—1.2 kg./cm.

Example 3

The same knobs of ABS resin as in Example 1 was activated in the same manner as in Example 1, except that the bath having a $H_2SO_4$ content of 700 g./liter was used and activation temperature of 70° C. was applied. The activated material was then chemically plated in the same manner as in Example 1, with the result shown below:

Covering rate—100%
Peeling test—1.2 kg./cm.

Comparison 2.—For comparison the same material as above was chemically plated in accordance with conventional 3-step method the same material as above, made of ABS resin, was dipped at 65° C. for 15 min. in 1 liter of an aqueous bath containing:

| | G./liter |
|---|---|
| $H_3PO_4$ | 295 |
| $K_2Cr_2O_7$ | 25 |
| $H_2SO_4$ | 900 |

After immersion, the resin material was washed with running water. The resin material thus treated was dipped at 20° C. for 3 min. (for sensitizing) in an aqueous bath containing:

$SnCl_2$—15 g./liter
36% HCl—40 ml./liter

The resultant material was thereafter dipped at 20° C. for 1 min. (for activating) in an aqueous bath containing:

$PdCl_2$—0.15 g./liter
36% HCl—7 ml./liter

After washing with running water, the resin material thus activated was subjected to chemical plating under the same conditions as above. The covering rate of the plated layer on the resin material was measured and peeling test was also conducted. The covering rate obtained was 70–80%, while the result of the peeling test was 1.0 kg./cm., thus proving superiority of the method of this invention.

Example 4

Activation.—ABS resin material the same as in Example 1 was dipped in a bath for 5 min. at the temperature listed in Table III. The bath contained:

$Ag_2SO_4$—1 g./liter
NaCl—2 g./liter
$H_3PO_4$—200 g./liter
$CrO_3$—25 g./liter
$H_2SO_4$—Amount listed in Table III.

After immersion, the resin material thus activated was washed with running water and dried at room temperature.

Chemical plating.—The activated resin material was treated in a bath of the same composition as used in Example 1 for chemical plating. The resultant material was washed and dried. The resin material chemically plated in this manner was found to have a smooth surfaced layer with high strength to adhere to the resin material. The covering rate achieved was listed in Table III.

TABLE III

| Activation temperature (° C.) | Content of $H_2SO_4$, percent | |
|---|---|---|
| | 900 g./liter | 1,200 g./liter |
| 37 | 100 | 100 |
| 50 | 100 | 100 |
| 70 | 100 | 100 |

Comparison 3.—For comparison the same ABS resin material as in the foregoing examples was treated under the same condition as above except that the bath contained no NaCl.

Chemical plating.—The resin material thus activated was subjected to chemical plating under the same conditions as above and covering rate of the chemically plated layer was measured with the result listed in Table IV.

TABLE IV

| Activation temperature (° C.) | Content of $H_2SO_4$, percent | |
|---|---|---|
| | 900 g./liter | 1,200 g./liter |
| 37 | 20 | 80 |
| 50 | 40 | 80 |
| 70 | 50 | 80 |

Example 5

The same material as in Example 4 was activated in the same manner as in Example 4, except that the bath having a $H_2SO_4$ content of 700 g./liter was used and activation temperature of 50° C. was applied. The activated material was then chemically plated in the same manner as in Example 1, with the covering rate of 100%.

Example 6

The same material as in Example 4 was activated in the same manner as in Example 4, except that the bath having a $H_2SO_4$ content of 500 g./liter was used and activation temperature of 70° C. was applied. The activated material was then chemically plated in the same manner as in Example 1, with the covering rate of 100%.

Example 7

Activation.—The same ABS resin material as in Example 1 was dipped in 1 liter of an aqueous bath for 10 min. at 50° C. The bath contained the following ingredients in the following proportions:

| | G./liter |
|---|---|
| $H_2SO_4$ | 800 |
| $CrO_3$ | 25 |
| $Ag_2O$ | 1 |
| NaCl | 2 |

After immersion, the resin material thus activated was washed with running water and dried at room temperature.

Chemical plating.—The activated resin material was subjected to chemical plating in a bath of the same composition as used in Example 1. After treatment, the material was washed with water and dried. The resin material thus chemically plated was found to have a smooth-surfaced layer with excellent property to adhere to the resin material. The covering rate achieved was 100%.

Example 8

Activation.—The same ABS resin material as in Example 1 was dipped in 1 liter of an aqueous bath for 10 min. at 40° C. The bath contained the following ingredients in the following proportions:

| | G./liter |
|---|---|
| $H_2SO_4$ | 900 |
| $H_3PO_4$ | 100 |
| $CrO_3$ | 20 |
| $AG_2SO_4$ | 1 |
| $CaCl_2$ | 2 |

After immersion, the resin material thus activated was washed with running water and dried at room temperature.

Chemical plating.—The activated resin material was subjected to chemical plating in a bath of the same composition as used in Example 1. After treatment, the material was washed with water and dried. The resin material thus chemically plated was found to have a smooth-surfaced layer with excellent property to adhere to the resin material. The covering rate achieved was 100%.

Example 9

Activation.—The same ABS resin material as in Example 1 was dipped in 1 liter of an aqueous bath for 5 min. at 75° C. The bath contained the following ingredients in the following proportions:

| | G./liter |
|---|---|
| $H_2SO_4$ | 1120 |
| $Ag_2CrO_4$ | 5 |
| KI | 3 |

After immersion, the resin material thus activated was washed with running water and dried at room temperature.

Chemical plating.—The activated resin material was subjected to chemical plating in a bath of the same composition as used in Example 1. After treatment, the material was washed with water and dried. The resin material thus chemically plated was found to have the covering rate of 100%.

Comparison 4

A resin material was treated for activation in the same manner as above except that the bath used contained no KI and then subjected to chemical plating under the same conditions as above. The covering rate achieved was 70%.

Example 10

Activation.—The same ABS resin material as in Example 1 was dipped in 1 liter of an aqueous bath for 15 min. at 45° C. The bath contained the following ingredients in the following proportions:

| | G./liter |
|---|---|
| $H_2SO_4$ | 1000 |
| $CrO_3$ | 10 |
| $Ag_2CO_3$ | 1 |
| KBr | 2 |

After immersion, the resin material thus activated was washed with running water and dried at room temperature.

Chemical plating.—The activated resin material was subjected to chemical plating in a bath of the same composition as used in Example 1. After treatment, the material was washed with water and dried. The resin material thus chemically plated was found to have the covering rate of 100%.

Comparison 5.—A resin material was treated for activation in the same manner as above except that the bath used contained no KBr and then subjected to chemical plating under the same conditions as above. The covering rate achieved was only 50%.

Example 11

Activation.—The same ABS resin material as in Example 1 was dipped in 1 liter of an aqueous bath for 20 min. at 35° C. The bath contained the following ingredients in the following proportions:

| | G./liter |
|---|---|
| $H_2SO_4$ | 850 |
| $H_3PO_4$ | 150 |
| $CrO_3$ | 40 |
| $Ag_2NO_3$ | 1 |
| KCl | 2 |

After immersion, the resin material thus activated was washed with running water and dried at room temperature.

Chemical plating.—The activated resin material was subjected to chemical plating in a bath of the same composition as used in Example 1. After treatment, the material was washed with water and dried. The resin material thus chemically plated was found to have the covering rate of 100%.

Comparison 6.—A resin material was treated for activation in the same manner as above except that the bath used contained no KCl and then subjected to chemical plating under the same conditions as above. The covering rate achieved was as low as 20%.

What we claim is:

1. An aqueous bath for activating the surface of plastics to be chemically metal-plated, which comprises 700 to 1200 grams per liter of $H_2SO_4$, 0.03 to 9 grams per liter of a silver compound, said silver compound being one species selected from the group consisting of silver oxide, silver nitrate, silver sulfate, silver chromate and silver carbonate, and 0.5 to 5 g. eq. of a metal halide per g. eq. of said silver compound, said metal halide being one species selected from the group consisting of alkali metal halide and alkali earth metal halide.

2. The bath of claim 1, wherein said $H_2SO_4$ is contained in the range of 900 to 1200 grams per liter, silver compound in the range of 0.1 to 5 grams per liter and metal halide in the range of 1–3 g. eq. per g. eq. of said silver compound.

3. An aqueous bath for activating the surface of plastics to be chemically metal-plated, comprising 500 to 1200 grams per liter of $H_2SO_4$, 1 to 50 grams by $CrO_3$ amount of a chrominum compound selected from the group consisting of chromic acid, chromic anhydride, alkali-metal chromate and alkali metal bichromate, 0.03 to 9 grams per liter of a silver compound, said silver compound being one species selected from the group consisting of silver oxide, silver nitrate, silver sulfate, silver chromate and silver carbonate, and 0.5 to 5 g. eq. of a metal halide per g. eq. of said silver compound, said metal halide being one species selected from the group consisting of alkali metal halide and alkali earth metal halide.

4. The bath of claim 3, wherein said $H_2SO_4$ is contained in the range of 700 to 1200 grams per liter, chrominum compound in the range of 6 to 45 grams by $CrO_3$ per liter, silver compound in the range of 0.1 to 5 grams per liter and metal halide in the range of 1–3 g. eq. per g. eq. of said silver compound.

5. The bath of claim 1, whereto 50 to 500 grams per liter of $H_3PO_4$ is further added.

6. The bath of claim 2, whereto 150 to 200 grams per liter of $H_3PO_4$ is further added.

7. The bath of claim 3, whereto 50 to 500 grams per liter of $H_3PO_4$ is further added.

8. The bath of claim 4, whereto 150 to 200 grams per liter of $H_3PO_4$ is further added.

9. A process for activating the surface of plastics to be chemically metal-plated comprising one step of contacting a plastics surface with the bath claimed in claim 1 at 10–80° C., for 1–20 min.

10. The bath of claim 1 wherein the metal halide is selected from alkali metal and alkaline earth metal chlorides, bromides and iodides.

11. The bath of claim 3 wherein the metal halide is selected from alkali metal and alkaline earth metal chlorides, bromides and iodides.

References Cited

UNITED STATES PATENTS

| | | | |
|---|---|---|---|
| 3,248,271 | 4/1966 | Rielly et al. | 117—47 |
| 3,437,507 | 4/1969 | Jensen | 117—47 |
| 3,448,055 | 6/1969 | Mickelson et al. | 252—79.3 |
| 3,471,320 | 10/1969 | Saubestre et al. | 117—47 |

LORENZO B. HAYES, Primary Examiner

U.S. Cl. X.R.

117—47 A, 130 E; 204—20, 30; 252—79.2